Jan. 29, 1963 L. R. KERN 3,075,581
INCREASING PERMEABILITY OF SUBSURFACE FORMATIONS
Filed June 13, 1960 2 Sheets-Sheet 1

ATTEST
Charles F. Steininger

INVENTOR.
Loyd R. Kern
BY
Attorney

Jan. 29, 1963  L. R. KERN  3,075,581
INCREASING PERMEABILITY OF SUBSURFACE FORMATIONS
Filed June 13, 1960  2 Sheets-Sheet 2

ATTEST
Charles F. Steininger

INVENTOR.
Loyd R. Kern
BY
Attorney

United States Patent Office 3,075,581
Patented Jan. 29, 1963

3,075,581
INCREASING PERMEABILITY OF SUBSURFACE FORMATIONS
Loyd R. Kern, Irving, Tex., assignor to The Atlantic Refining Company, Philadelphia, Pa., a corporation of Pennsylvania
Filed June 13, 1960, Ser. No. 35,649
20 Claims. (Cl. 166—42)

The present invention relates to an improved method for increasing the permeability of subsurface formations. In a more particular aspect, the present invention relates to an improved method for increasing the permeability of subsurface formations by depositing in an existing or created fracture a porous pack of propping agent.

It is now well known in the art of petroleum production techniques that subsurface formations containing hydrocarbons can be made more permeable and thus more readily produced if an existing fracture in the formation is propped open with a solid particulate propping agent or a fracture in the formation is created and thereafter propped open with such propping agent. It is also known that the production rate of water-producing formations can be similarly improved and that increased injectivity of oil-displacing fluids into a formation can be obtained by such techniques. Generally, such fracturing and propping is carried out by disposing a fluid, such as water, crude oil, kerosene, gelled water, gelled crude oil, gelled kerosene, or emulsions opposite the formation of interest and applying sufficient hydraulic pressure to such fluid to crack the formation and form a fracture therein. Following such fracturing of the formation, a fluid carrying a suitable solid particulate propping agent is then injected and the propping agent carried into the fracture by this carrier fluid. Leakoff or subsequent removal of the propping agent carrier will then deposit the propping agent in the fracture and the fracture will be held open. Since even very small-grained propping agents will result in a higher permeability through the propped fracture than through the formation itself, the ease with which oil can be produced from the formation is greatly improved.

There is, however, some difficulty with the use of small-grained conventional material, such as sand, when used as propping agents in that these small-grained materials pack together very tightly and also if they are not packed tightly they tend to crush under pressure and result in even lower permeability. In order to overcome these difficulties, application Serial No. 659,496, now Patent No. 2,950,247, entitled "Increasing Permeability of Subsurface Formations" and filed May 16, 1957 by applicant and William J. McGuire, Jr., of which the present application is a continuation-in-part, provides for the use of specific large-sized, noncrushable materials as propping agents for formation fractures. The use of such large-sized, noncrushable materials results in fracture permeabilities which are several-fold greater than that which can be obtained by the use of conventional small-sized sand and the like. However, it has been found that the use of such large-sized materials often results in the well bore rapidly becoming bridged with the propping agent at a point opposite the fracture to be filled with propping agent thus restricting one's ability to deposit the large-sized material in the fracture as desired.

Accordingly, it is an object of the present invention to provide an improved method of increasing the permeability of subsurface formations.

Another and further object of the present invention is to provide an improved method of increasing the permeability of subsurface formations wherein a solid particulate material is deposited in a fracture in said formation.

Still another object of the present invention is to provide an improved method of increasing the permeability of a subsurface formation wherein a large-sized solid particulate material is deposited in a fracture in said formation.

These and other objects of the present invention will become apparent from the following detailed description when read in conjunction with the drawings, wherein.

In accordance with the present invention, it has been found that rapid bridging of propping agent across the well bore can be overcome in a fracturing operation involving the use of large-sized propping agents by preceding the large-sized materials with a mixture of large and small-sized material.

Figure 1:
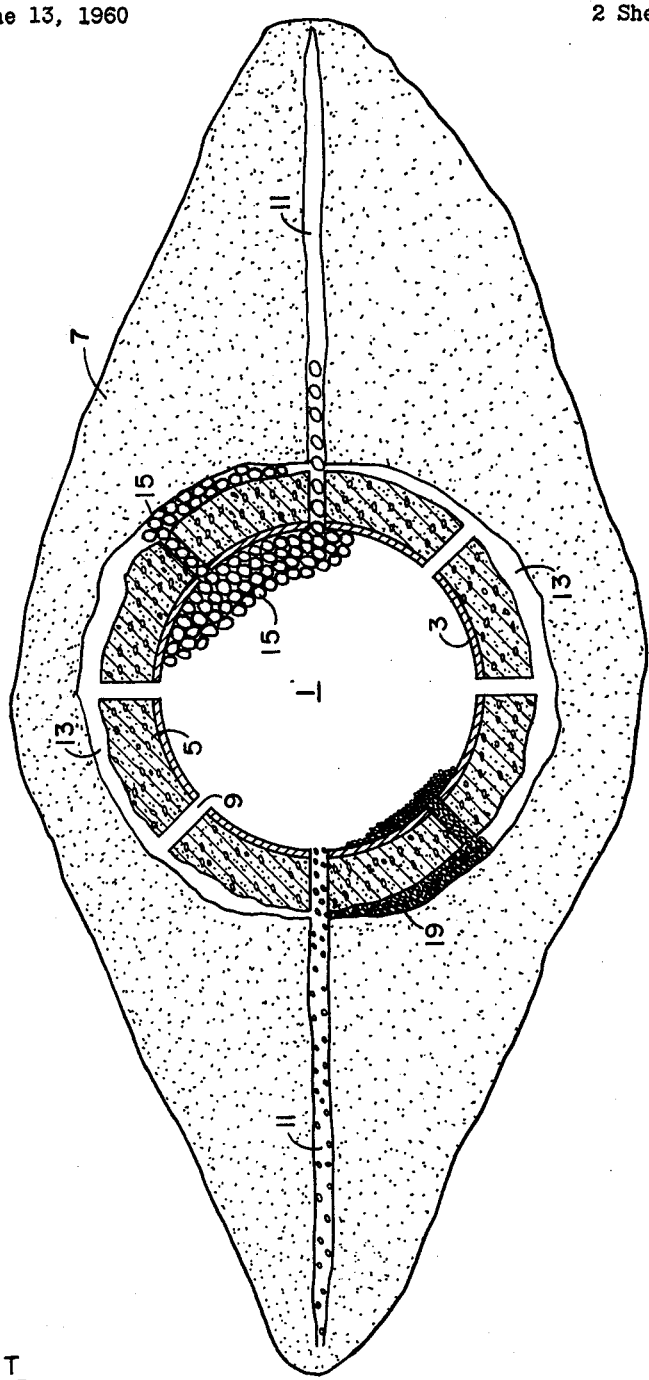
FIGURE 1 is a horizontal section through a subsurface earth formation showing the conditions which occur partway through a fracture-propping operation when using small-sized propping agents and when using large-sized propping agents.

Referring specifically to FIGURE 1, this drawing shows a horizontal section of a subsurface formation in which a borehole 1 has been drilled. A casing 3 has been placed in the borehole in order to facilitate production of fluids from subsurface formations. Casing 3 obviously is smaller in diameter than the diameter of the hole originally drilled and, therefore, in order to anchor the casing in place in the hole and to prevent production of undesirable fluids from formations above and below the formation of interest, cement 5 is squeezed between casing 3 and the earth formation 7 and is permitted to solidify in this position. In order to produce the formation, and obviously in order to fracture and prop open the fractures, the casing 3 and cement 5 are perforated by conventional gun-type perforators and the like to produce perforations 9 therethrough. Actually, perforations 9 extend a few inches into formation 7 but, in order to simplify the illustration, this is not shown.

This is the situation which exists prior to the time a fracturing operation is carried out. When a fracturing operation is carried out, fluid is disposed opposite the formation in borehole 1 and is forced by hydraulic pressure through the perforations and against the formation itself. When sufficient pressure has been applied, fractures 11 will be produced in the formation. However, it is obvious that these fractures will not be created opposite each and every perforation due to the differences in the stresses involved and the like. Accordingly, the fractures are generally created opposite two or more opposing perforations, and no fractures occur opposite other perforations. This situation is shown in FIGURE 1. At the same time that fractures 11 are opened, the opening of such fractures forces formation 7 away from cement 5 thereby producing a void space between the formation and the cement which is indicated as 13 in the drawing. Void space 13 is generally about as wide as the mouth of fracture 11 at a point 90° away from fracture 11.

With the above-described situation, it has been found that when a large-sized propping agent is pumped into the well and out into fracture 11, this material also tends to go through perforations which have no fractures in communication therewith and into the void space between cement 5 and formation 7. Since the propping agent is a large-sized material, it will become lodged in void space 13 near fracture 11 and will not pass into the fracture. When this happens, fluid carrier material flows rather freely through the highly permeable pack of propping agent and this more rapid flow tends to rapidly settle out and build up a bridge of propping agent across the well bore as shown at 15. This situation also occurs at all other perforations not in communication with a fracture. On the other hand, small-sized material generally will not result in such rapid buildup of propping agent in the well bore since such material will usually be small enough to pass through the perforation, through void space 13 and into the fracture and, therefore, cause no great difficulty. In addition, in those cases in which small-sized propping agent does lodge in void space 13, the problem of bridging of the propping agent across the well bore has been found to be much less serious than it is in the case of large-sized agents and no difficulty is experienced. This is shown at 19 in FIGURE 1. The fact that rapid buildup of small-sized propping agent and bridging across the well bore does not occur in this case has been found to be due to the fact that flow of fluid through packed section 19 is substantially less than the rate of flow into the fractures and, therefore, the fluid carrying propping agent will flow into the fractures much more readily than into the region of noncommunicating perforations. Thus, little or no buildup of small-sized propping agent will occur in this instance.

Figure 2:
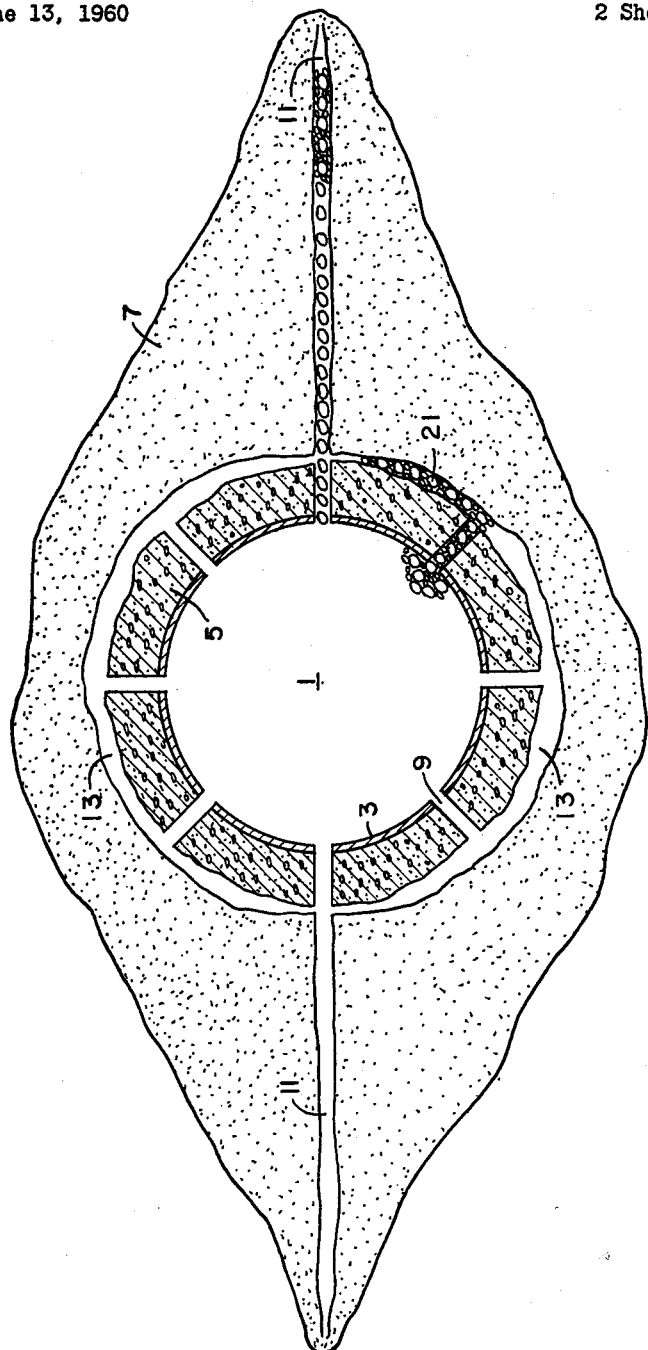
FIGURE 2 is a horizontal section of a subsurface formation similar to that of FIGURE 1 showing the situation which exists when the method of the present invention is practiced.

In accordance with the present invention, before a large-sized propping material is injected into a well to prop formation fractures, this material is preceded by a mixture of large and small material; and this mixture greatly reduces the tendency of the later injected large-sized material to bridge across the well bore. When such a mixture is injected, the large-sized props will wedge in the void space 13, but small-sized material will fill the void spaces between the large particles. This situation is shown at 21 in FIGURE 2. With void space 13 thus tightly packed with propping agent and having a relatively low permeability, fluid flow of propping agent carrier through the perforations through void space 13 and thence into fracture 11 is greatly reduced and in effect is substantially nonexistent. As a result, there is no tendency to build up a quantity of propping agent opposite the perforations which are not in direct communication with a fracture and form a bridge of propping agent across the well bore. After a sufficient quantity of mixed large- and small-sized propping agent to fill voids 13 has been utilized, large-sized propping material without sand or smaller propping material is injected and deposited in fractures 11. In order to reduce the overall cost of a treatment, it is obvious that the mixture of large and small-sized propping agent may be preceded by a volume of small-sized propping agent, preferably sand.

As used in parent application Serial No. 659,496, now Patent No. 2,950,247, large-sized propping agents include materials above about 20 mesh or 0.03 inch in diameter. Materials below this size are referred to herein as small-sized propping agents.

Suitable materials for use as large-sized propping agents include the manufactured, formable materials set forth in the subject parent application, such as metallic, ceramic, and plastic materials, and includes steel shot, alumina, aluminum, alloys of aluminum and other metals, glass and various plastics. Other suitable large-sized propping agents include naturally occurring organic materials, such as crushed and rounded walnut shells, peach seeds, coconut shells, pecan shells, and seeds such as grape seed and the like which have not been crushed. Such materials can be used in diameters as high as one-quarter inch and improved results obtained by the use of such larger sized materials. The smaller sized materials employed in accordance with this invention include the above-mentioned propping agents as well as more conventional materials such as sand. Preferably, the large-sized propping agents employed are the materials referred to in the parent application which are capable of supporting loads of 40 pounds per particle or more without fragmentation. Aluminum, aluminum alloys and alumina meet this requirement and, in addition, have certain advantages which are not possessed by glass, plastics and other metallic materials such as steel shot. In addition, known plugging agents, such as finely divided clay, etc., may be added to the mixture of large- and small-sized propping agents as desired or necessary to plug the void spaces 13.

By way of specific example, a fracturing operation was carried out at a depth of 3,438 feet in a well located in Kansas. This well had been previously fractured and the fracture propped with 5,000 pounds of 20 to 40 mesh sand. As is well known, the production rate gradually decreased until at the date of treatment by the present invention the production rate was 5 barrels per day. A fracture was created in this formation by conventional application of hydraulic pressure to the formation. Thereafter, 15,000 pounds of 20 to 40 mesh sand were suspended in a suitable carrier followed by a suspension of a mixture of 2,500 pounds of 20 to 40 mesh sand and 250 pounds of 12 to 16 mesh aluminum and finally 1,850 pounds of 12 to 16 mesh aluminum. As a result of this treatment, the production rate of the well was increased to 48 barrels per day. If this refracture job had been carried out using 20 to 40 mesh sand alone, it was predicted that the production rate would be in the neighborhood of 7 barrels per day. In addition, while severe bridging and failure to deposit the desired volume of aluminum in a fracture had been experienced on several previous occasions in the treatment of other wells, no bridging occurred in this test, and only a very small amount of aluminum settled in the well bore.

The relative proportions of large to small-sized propping agent to be employed in the mixture of the present invention depends to a great extent upon the nature of the formation being treated and the width of the fractures produced. However, it has been found that, in general, a mixture containing between about 25 and 75 percent by volume of the small-sized material will be adequate. Also the volume of mixture which should precede the large-sized propping agent is variable and dependent upon the nature of the formation being treated, the number of perforations and the volume of propping agent to be employed. As a guide, however, the mixture should not exceed more than about ten percent of the total of the volume of mixture plus the volume of the later injected large-sized propping agent.

It will be obvious to one skilled in the art that many variations of the present invention can be practiced. However, basically, the present invention includes injection of a small-sized propping agent, then a mixture of small-sized and large-sized propping agents, and finally large-sized propping agent or a mixture of small and large-sized propping agents followed by large-sized propping agent.

I claim:
1. A method for increasing the permeability to fluids of subsurface earth formations penetrated by a well bore having a casing placed therein opposite said formations, comprising; creating a plurality of perforations in said casing; creating fractures in said formation opposite some of said perforations; pumping into said fractures a fluid suspension of a mixture of large, generally spherical propping agent having a diameter greater than 0.03 inch and small, generally spherical propping agent having a diameter less than 0.03 inch; filling the void space between said formation and said casing, formed by the application of pressure through those of said perforations opposite which no fractures were formed during the fracturing step, with a pack of said mixture of substantially reduced permeability to fluid flow; and thereafter pumping into said fractures a fluid suspension of said large propping agent alone.

2. A method in accordance with claim 1 wherein the small propping agent is sand.

3. A method in accordance with claim 1 wherein the large propping agent is a naturally occurring material.

4. A method in accordance with claim 1 wherein the large propping agent is a manufactured, formable material.

5. A method in accordance with claim 4 wherein the manufactured, formable material is metallic.

6. A method in accordance with claim 5 wherein the metallic material is aluminum.

7. A method in accordance with claim 5 wherein the metallic material is an aluminum alloy.

8. A method in accordance with claim 4 wherein the manufactured, formable material is ceramic.

9. A method in accordance with claim 8 wherein the ceramic material is alumina.

10. A method in accordance with claim 4 wherein the manufactured, formable material is a plastic.

11. A method for increasing the permeability to fluids of subsurface earth formations penetrated by a well bore having a casing disposed therein opposite said formations, comprising; creating a plurality of perforations in said casing; creating fractures in said formation opposite some of said perforations; pumping into said fractures a fluid suspension of a small, generally spherical propping agent having a diameter less than 0.03 inch; pumping into said fractures a fluid suspension of a mixture of large, generally spherical propping agent having a diameter greater than 0.03 inch and said small propping agent; filling the void space between said formation and said casing, formed by the application of pressure through those of said perforations opposite which no fractures were formed during the fracturing step, with a pack of said mixture of substantially reduced permeability to fluid flow; and thereafter pumping into said fracture a fluid suspension of said large propping agent alone.

12. A method in accordance with claim 11 wherein the small propping agent is sand.

13. A method in accordance with claim 11 wherein the large propping agent is a naturally occurring material.

14. A method in accordance with claim 11 wherein the large propping agent is a manufactured, formable material.

15. A method in accordance with claim 14 wherein the manufactured, formable material is metallic.

16. A method in accordance with claim 15 wherein the metallic material is aluminum.

17. A method in accordance with claim 15 wherein the metallic material is an aluminum alloy.

18. A method in accordance with claim 14 wherein the manufactured, formable material is ceramic.

19. A method in accordance with claim 18 wherein the ceramic material is alumina.

20. A method in accordance with claim 14 wherein the manufactured, formable material is a plastic.

References Cited in the file of this patent

UNITED STATES PATENTS

| | | |
|---|---|---|
| 2,699,212 | Dismukes | Jan. 11, 1955 |
| 2,703,619 | Sutherlin | Mar. 8, 1955 |
| 2,774,431 | Sherborne | Dec. 18, 1956 |